United States Patent [19]

Nakajima et al.

[11] Patent Number: 4,943,701
[45] Date of Patent: Jul. 24, 1990

[54] APPARATUS FOR AND METHOD OF DETECTING ARC LENGTH, APPARATUS FOR AND METHOD OF CONTROLLING WELDING TORCH HEIGHT, AND AUTOMATIC WELDER AND AUTOMATIC WELDING METHOD

[75] Inventors: Jun Nakajima, Chiba; Takeshi Araya, Higashikureme; Susumu Hioki, Kashiwa, all of Japan

[73] Assignee: Hitachi, Ltd., Tokyo, Japan

[21] Appl. No.: 324,555

[22] Filed: Mar. 16, 1989

[30] Foreign Application Priority Data

Mar. 18, 1988 [JP] Japan ................................ 63-63378

[51] Int. Cl.$^5$ ............................................. B23K 9/095
[52] U.S. Cl. ........................... 219/124.02; 219/130.01
[58] Field of Search ...................... 219/124.02, 124.03, 219/124.34

[56] References Cited

U.S. PATENT DOCUMENTS 4,435,631  3/1984  Drouet et al. ................. 219/124.02

FOREIGN PATENT DOCUMENTS 51-67242  10/1976  Japan .
61-14083   1/1986  Japan .
WO81/01676  6/1981  World Int. Prop. O. .

Primary Examiner—Clifford C. Shaw
Attorney, Agent, or Firm—Antonelli, Terry, Stout & Kraus

[57] ABSTRACT

An apparatus for automatically controlling the welding condition or the welding torch position in arc welding which makes use of a welding power source of constant-voltage or constant-current type. The apparatus has an oscillator for superposing a signal of a predetermined frequency to the arc and a detector for detecting the arc sound pressure level corresponding to the frequency of the superposed signal. This apparatus is capable of accurately detecting the arc length or other factors by a simple method without being substantially affected by the noises produced by the arc. Control of the torch position, as well as welding conditions such as welding current, arc voltage and so on, can be precisely performed by making use of the detection of the arc length.

24 Claims, 8 Drawing Sheets

PA ---- ARC SOUND PRESSURE LEVEL
ΔPA ---- FLUCTUATION OF ARC SOUND PRESSURE LEVEL
T ----- TIME
P ----- SOUND PRESSURE LEVEL

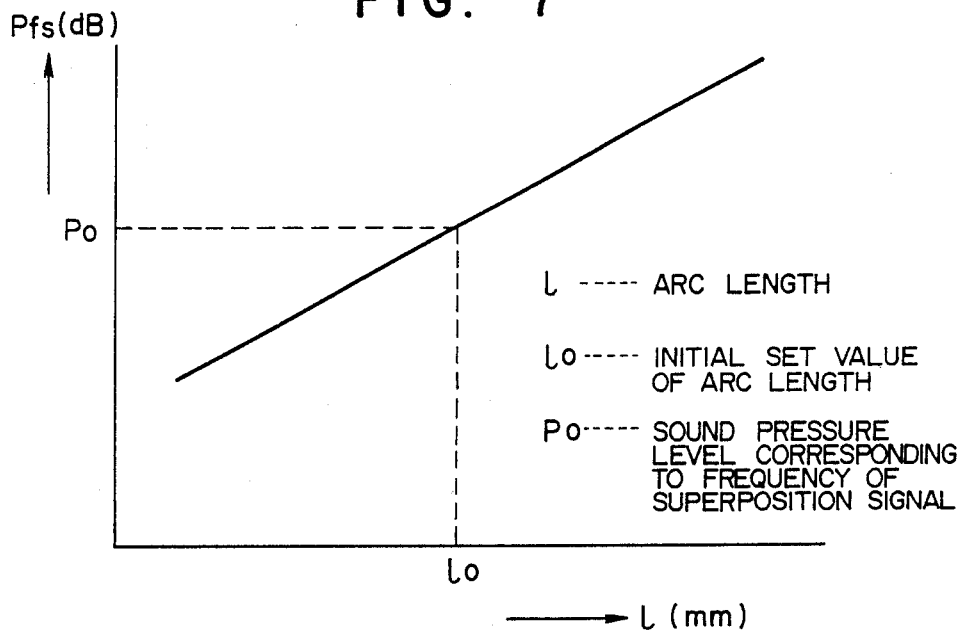
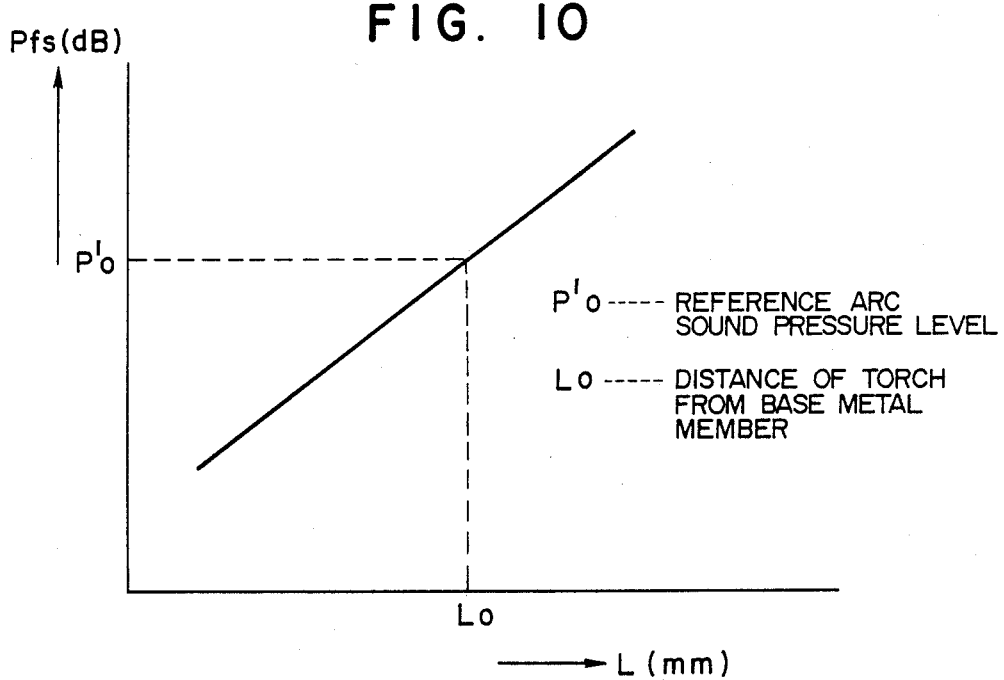

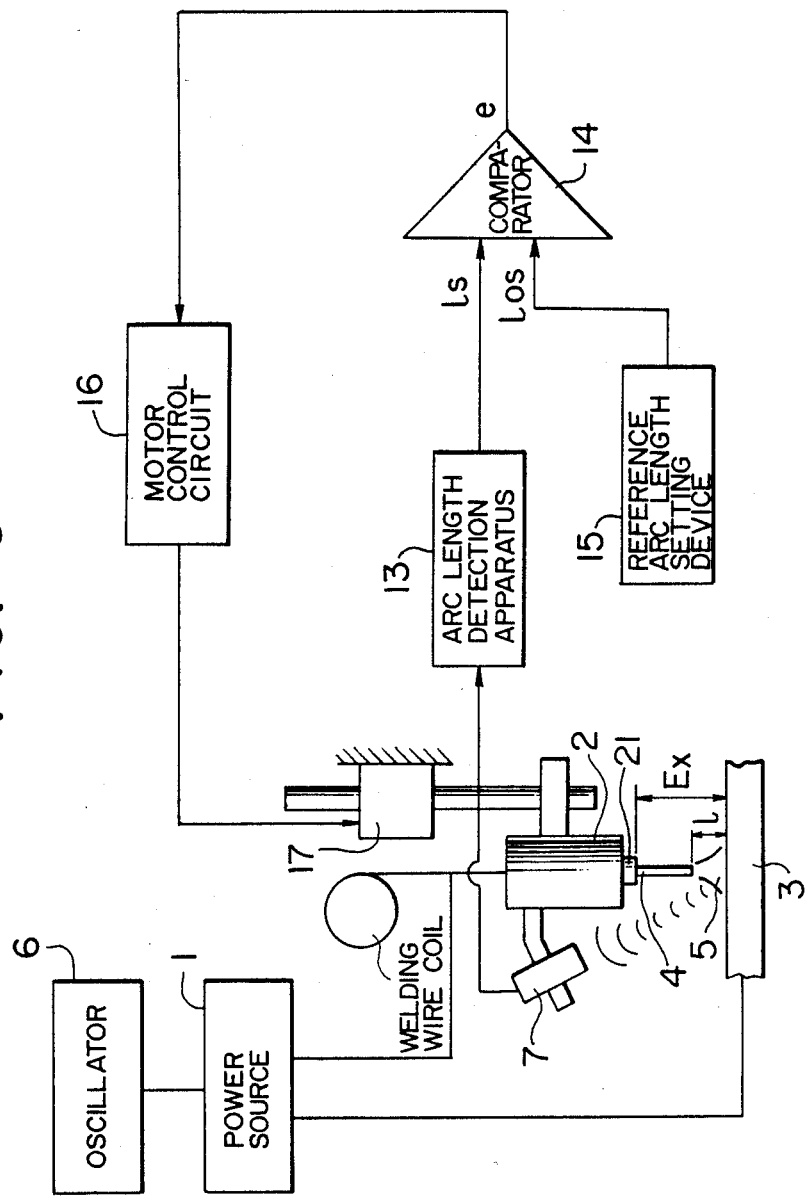

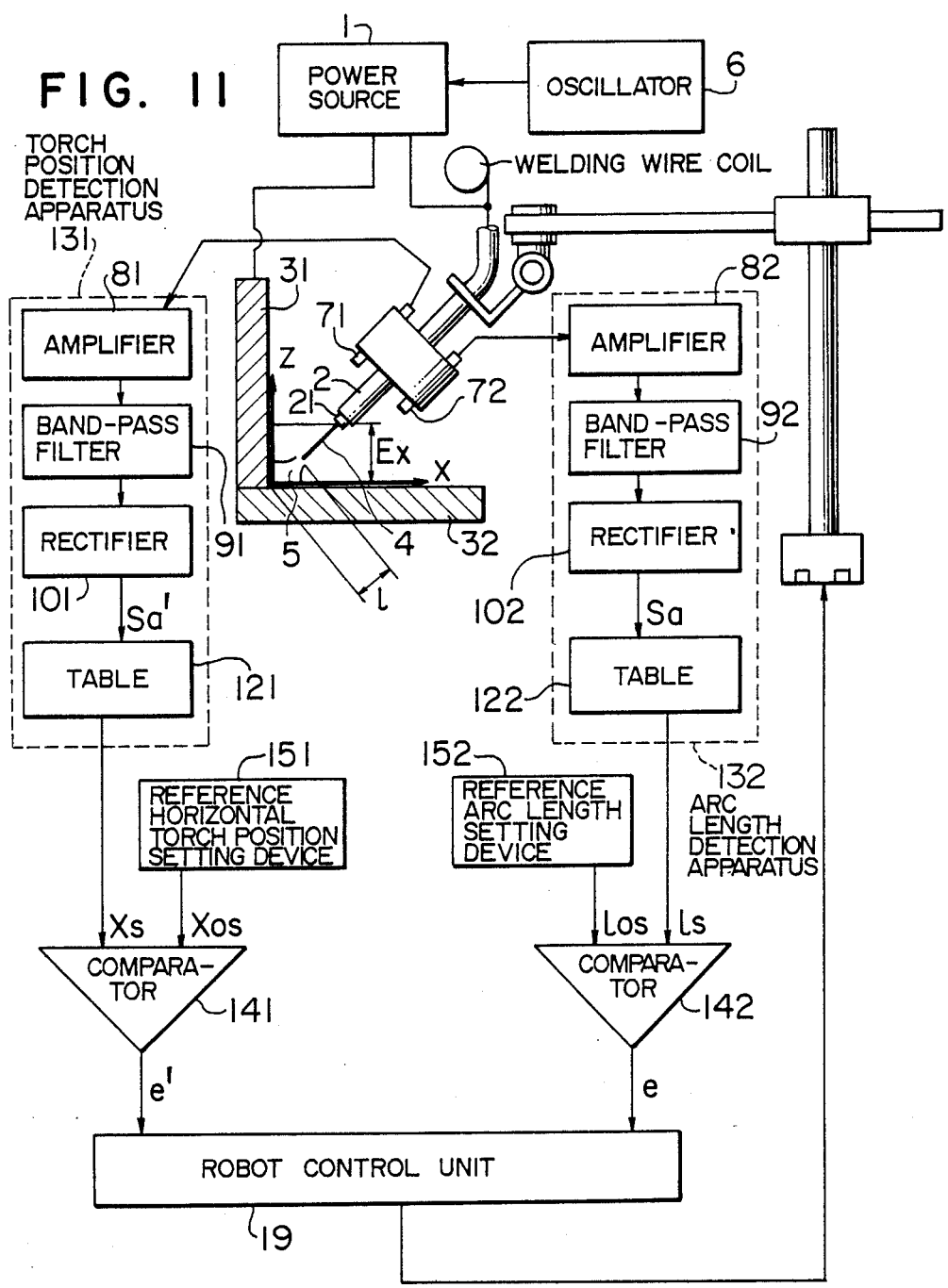

$X_{os}$ --- ELECTRICAL SIGNAL DERIVED FROM REFERENCE HORIZONTAL TORCH POSITION SETTING DEVICE

APPARATUS FOR AND METHOD OF DETECTING ARC LENGTH, APPARATUS FOR AND METHOD OF CONTROLLING WELDING TORCH HEIGHT, AND AUTOMATIC WELDER AND AUTOMATIC WELDING METHOD

BACKGROUND OF THE INVENTION

FIELD OF THE INVENTION

The present invention relates to an apparatus for and a method of detecting arc length, an apparatus for and a method of controlling welding torch height, and an automatic welder and an automatic welding method. More particularly, the present invention is concerned with an arc length detection method, a welding torch height control method and welding condition control method, as well as apparatus for carrying out these methods, suitable for use in automatic welding which makes use of a welding power supply having constant-voltage or constant-current characteristics.

DESCRIPTION OF THE RELATED ART

In the field of arc welding, methods have been proposed for enabling automatic control of the distance between a welding torch and a base metal member (referred to as "torch height" hereinafter). For instance, Japanese Pat. Unexamined Publication No. 51-67242 discloses two types of method: namely, a so-called mechanical method in which the torch height is detected mechanically by means of a probe or a contactor secured to the welding torch, and a so-called electrical method in which the torch height is controlled by lifting and lowering relays which are energized in a controlled manner in accordance with a change in the welding current.

The mechanical method, however, is not preferred because it requires a complicated arrangement including a probe to be attached to the torch or other part near the torch, resulting in a lower efficiency of the welding work. In addition, the mechanical method tends to be adversely affected by welding conditions such as spatter, heat and so forth, impairing the torch height controlling performance. The electrical method is generally free from the problems encountered with the mechanical method, because it makes use of welding phenomena. In general, however, welding phenomena include complicated disturbance factors, and transfer of particles vary according to the welding conditions. In order to realize reliable automatic torch height control, a complicated electric circuit is required which raises the cost of the apparatus to an impractical level.

Methods also have been proposed for controlling welding conditions such as welding current and arc voltage. For instance, Japanese Pat. Unexamined Publication No. 61-14083 discloses, with the knowledge that the sound (referred to as "arc sound") generated at the weld portion is closely related to the welding phenomena, a method in which the vibration of the arc column is detected by, for example, a microphone and the shielding condition of the weld portion is checked in accordance with the result of the detection.

This method is suitable for detecting extreme change in the arc sound attributable to a disturbance of the shield gas stream, but is not suitable for detecting a slight change in the welding current or voltage caused by any reason because of difficulty encountered with the evaluation of the welding condition caused by the many noise components of the arc and vibration of the arc itself. Ordinary welding power supplies having drooping characteristics, except for a power supply having a complete constant-voltage characteristics, and generally experience variation in the welding current and arc voltage as a result of a change in the arc length. In case of a power supply used in TIG welding, the welding current is maintained constant by virtue of the constant voltage characteristics, but the arc voltage is changed undesirably. The arc voltage is substantially proportional to arc length so that the welding conditions can be controlled if the arc length can be suitably controlled. In addition, the detection of the arc length enables the torch height to be adequately controlled.

SUMMARY OF THE INVENTION

The present invention is aimed at providing highly practical methods for detection of arc length, control of torch height and control of welding condition on the basis of arc sound, as well as apparatus for carrying out these methods.

To these ends, according to the present invention, an overlap signal is superposed on an arc and the detection and/or control of the arc length and/or torch height is effected on the basis of the arc sound pressure level corresponding to the frequency of the superposed signal.

Definition of terms will be given in regard to the positional relationship between the torch according to the present invention and the base metal members as the welding object. In some cases, the base metal members are a pair of flat tabular sheets which are held in horizontal posture or a pair of flat tabular sheets abutting together at an angle to each other. Thus, the term base metal members is used to mean welding objects of a variety of shapes and positions with which the welding by the present invention can be carried out. One of the base metal members is always on a vertical line passing through the torch, i.e., on a line which passes the torch and extends in the direction of the gravity. Thus, the term "torch height" is used to mean the distance between the welding object and any desired portion of the torch as measured in the vertical direction or in the direction of gravity. A predetermined length of a welding wire always projects from the end of the torch or a tip which is the wire attaching portion on the end of the torch, so that fixed positional relationships exist between the torch, tip and the welding wire. Thus, the control of the torch height can be treated as the control of the distance between the wire end and the base metal member or the distance between the torch end and the base metal member or the distance between a desired portion of the torch body and the base metal member. The term "horizontal torch position" or the "lateral torch position" is used to mean the distance between the welding line and the point where a vertical line which extends downward from a desired portion of the torch body towards the base metal member intersects the upper surface of the member when a portion of the base metal members exists at a lateral side of the torch or the welding wire. When the positional relationship or the shape of the base metal members portion on the lateral side of the torch or of the welding wire with respect to the welding line is constant along the welding line, the horizontal distance between a desired portion of the torch and the above-mentioned lateral portion of the base metal members or, alternatively, the distance between the above-mentioned crossing point of the vertical line and the lateral portion of the base metal members is used as a reference for determining the lateral or horizontal position.

The invention provides an arc length detection apparatus comprising: oscillation means for superposing a predetermined signal on a welding arc; arc sound detecting means for detecting the welding arc sound generated by the arc with the predetermined signal superposed thereon; sound pressure level extraction means for extracting, from the output of the arc sound detecting means, the arc sound pressure level signal having a frequency corresponding to the frequency of the predetermined signal; and arc length determination means for determining the value of the length of the welding arc from a previously stored relationship between the arc length and the arc sound pressure level, in accordance with the arc sound pressure level signal output from the sound pressure level extraction means.

The invention also provides an arc length detection method comprising: superposing a predetermined signal to a welding arc; determining arc sound pressure level of a frequency corresponding to the frequency of the predetermined signal from the sound received from the welding arc; and determining the length of the welding arc from a predetermined relationship between the arc sound pressure level and arc length, in accordance with the determined arc sound pressure level.

The invention also provides a torch height control apparatus comprising: comparator means for conducting comparison between an electrical signal output from the arc length detection apparatus and corresponding to the arc length and a set arc length signal derived from a reference arc length setting device; and driving means for driving the welding torch up and down in such a manner as to negate an offset signal from the comparator means, thereby controlling the welding torch at a constant height.

Another form of the torch height control apparatus of the invention has oscillation means for superposing a predetermined signal on a welding arc; arc sound detecting means for detecting the welding arc sound generated by the arc with the predetermined signal superposed thereon; sound pressure level extraction means for extracting, from the output of the arc sound detecting means, the arc sound pressure level signal having a frequency corresponding to the frequency of the predetermined signal; and torch height control means for controlling the torch height in terms of the distance between the torch and a base metal member from a previously stored relationship between the arc sound pressure level and the torch height, in accordance with the arc sound pressure level signal output from the sound pressure level extraction means.

The invention also provides a torch height control method comprising: comparing an electrical signal corresponding to the arc length determined by the abovementioned arc length detection method with a set signal derived from a reference arc length setting device; and driving the welding torch up and down in such a manner as to negate the output offset signal obtained as a result of the comparison.

Another form of the torch height control method of the invention has superposing a predetermined signal to a welding arc; determining arc sound pressure level of a frequency corresponding to the frequency of the predetermined signal from the sound received from the welding arc; and controlling the torch height in terms of the distance between the torch and the base metal member from a predetermined relationship between the arc sound pressure level and the torch height, in accordance with the determined arc sound pressure level.

The invention also provides an automatic welding apparatus comprising: comparator means for comparing an electrical signal output from the arc length detection apparatus and corresponding to the arc length with a set signal derived from the reference arc length setting device; and welding condition control means for controlling the welding condition in such a manner as to negate an offset signal obtained as a result of comparison performed by the comparator means.

The invention also provides an automatic welding method comprising: comparing an electrical signal corresponding to the arc length determined by the aforementioned arc length detection method with a set signal derived from a reference arc length setting device; and controlling the welding condition in such a manner as to negate an offset signal obtained as a result of the comparison.

The present invention can be applied to welding of joints such as L-shaped joints. Such an application encounters a difficulty in the lateral or horizontal driving of the torch. In this case, the sound reflected by the base metal member is changed so that the sum of the reflected sound and the sound directly transmitted from the welding arc is treated as the sound which is used as the index for the control of vertical and/or horizontal position of the torch. Thus, the present invention includes any art for controlling the vertical and/or horizontal position provided that the above-described principle is utilized.

Thus, the present invention in another aspect provides an apparatus for detecting horizontal position of a welding torch comprising: oscillation means for superposing a predetermined signal on a welding arc; arc sound detecting means for detecting the welding arc sound generated by the arc with the predetermined signal superposed thereon; sound pressure level extraction means for extracting, from the output of the arc sound detecting means, the arc sound pressure level signal having a frequency corresponding to the frequency of the predetermined signal; and horizontal torch position determination means for determining the horizontal position of the welding torch from a previously stored relationship between the horizontal torch position and the arc sound pressure level, in accordance with the arc sound pressure level signal output from the sound pressure level extraction means. This apparatus may be used in combination with the aforementioned arc length detection apparatus.

The invention also provides a method for detecting horizontal position of a welding torch comprising: superposing a predetermined signal to a welding arc; determining arc sound pressure level of a frequency corresponding to the frequency of the predetermined signal from the sound received from the welding arc; and determining the horizontal torch position from a predetermined relationship between the arc sound pressure level and horizontal torch position, in accordance with the determined arc sound pressure level. This method also may be used together with the aforementioned arc length detection method.

The invention also provides a torch position control apparatus comprising: comparator means for conducting comparison between an electrical signal output from the horizontal torch position detection means and corresponding to the horizontal torch position and a set torch position signal derived from a reference horizontal torch position setting device; and driving means for driving the welding torch horizontally in such a manner as to negate an offset signal from the comparator means, thereby controlling the welding torch at a constant horizontal position. This apparatus can advantageously be used in combination with the aforementioned torch height control apparatus.

Another form of the torch position control apparatus has oscillation means for superposing a predetermined signal on a welding arc; arc sound detecting means for detecting the welding arc sound generated by the arc with the predetermined signal superposed thereon; sound pressure level extraction means for extracting, from the output of the arc sound detecting means, the arc sound pressure level signal having a frequency corresponding to the frequency of the predetermined signal; and torch position control means for controlling the distance between the torch and the base metal member and/or horizontal torch position from a previously stored relationship between the arc sound pressure level and the horizontal torch position, in accordance with the arc sound pressure level signal output from the sound pressure level extraction means.

The invention also provides a torch position control method comprising: comparing an electrical signal corresponding to the horizontal torch position determined by the above-mentioned horizontal torch position detection method with a set signal derived from a reference torch position setting device; and driving the welding torch horizontally in such a manner as to negate the output offset signal obtained as a result of the comparison. This technique also is preferably used in combination with the aforementioned torch height control method.

Another form of the torch position control method comprises superposing a predetermined signal to a welding arc; determining arc sound pressure level of a frequency corresponding to the frequency of the predetermined signal from the sound received from the welding arc; and controlling the horizontal torch position from a predetermined relationship between the arc sound pressure level and the horizontal torch position, in accordance with the determined arc sound pressure level. This method also may be used in combination with the aforementioned torch height control method.

The invention also provides an automatic welding apparatus comprising: comparator means for comparing an electrical signal output from the aforementioned horizontal torch position detection apparatus and corresponding to the horizontal torch position with a set signal derived from a reference horizontal torch position setting device; and welding condition control means for controlling the welding condition in such a manner as to negate an offset signal obtained as a result of comparison performed by the comparator means. This apparatus also is preferably used in combination with the aforementioned arc length detection apparatus.

Finally, the invention provides an automatic welding method comprising: comparing an electrical signal corresponding to the horizontal torch position determined by the torch position detection apparatus with a set signal derived from a reference horizontal torch position setting device; and controlling the welding condition in such a manner as to negate an offset signal obtained as a result of the comparison. This apparatus also is preferably used in combination with the aforementioned arc length detection method.

Thus, in the present invention, a predetermined signal is superposed to welding arc occurring in arc welding and arc sound level obtained through processing the arc sound is utilized in the positioning of the torch.

A constant-voltage type power source or a constant-current type power source is used as the power source in the automatic welder of the present invention.

An A.C. signal is preferably used as the predetermined signal to be superposed. Such an A.C. signal can have various waveforms such as triangular waveforms and rectangular waveforms. It is also to be noted that the amplitude or frequency of the signal to be superposed may be varied at an intermediate portion of the application period.

The memory means stores the relationship between the arc length or the torch height and the arc sound pressure level corresponding to the arc length or the torch height. The arc sound detecting means preferably has an internal or an external deciding means to decide whether a power circuit is shorted or not and preferably picks up the arc sound only when the arc is normally maintained.

For instance, when automatic welding is executed using a power source having a constant voltage characteristic (in general, slightly drooping characteristics), the arc length varies according to welding conditions such as the torch height, wire feed fluctuation and welding condition. It is also known from experiments that the arc sound itself contains many pulsating components. Therefore, the detection of the torch height relying upon the arc sound itself has a small S/N ratio and, hence, has a small reliability. The arc sound, however, is closely related to the welding phenomena, so that it has been considered and discussed as being one of important factors to be detected for the purpose of automatic welding control.

The invention is based upon a knowledge which has been confirmed through experiment: namely, the fact that the S/N ratio can be raised by externally adding a superposition signal to the arc and the sound pressure level corresponding to the frequency of the superposition signal corresponds to a change in the arc length. Thus, according to the present invention, the arc length can be determined in accordance with the sound level at the frequency of the superposition signal and the control of the torch height or the welding condition, as well as horizontal torch position, can be adequately conducted on the basis of the thus determined arc length.

The present invention thus enables, through a simple method which is free from the influence of noises, a highly precise detection of the arc length and control of the torch position and welding condition.

BRIEF DESCRIPTION OF THE DRAWINGS

FIG. 7 is a chart showing the arc length-sound pressure level characteristic of the apparatus of FIG. 1;

FIGS. 8 and 9 are block diagrams of torch height control apparatus embodying the present invention;

FIG. 10 is a characteristic chart showing sound pressure level-torch height characteristic of the apparatus shown in FIG. 9;

FIG. 11 is a block diagram of another example of a welding line copying apparatus in accordance with the present invention.

DESCRIPTION OF THE PREFERRED EMBODIMENTS

Preferred embodiments of the present invention will be described with reference to the accompanying drawings.

Figure 1:
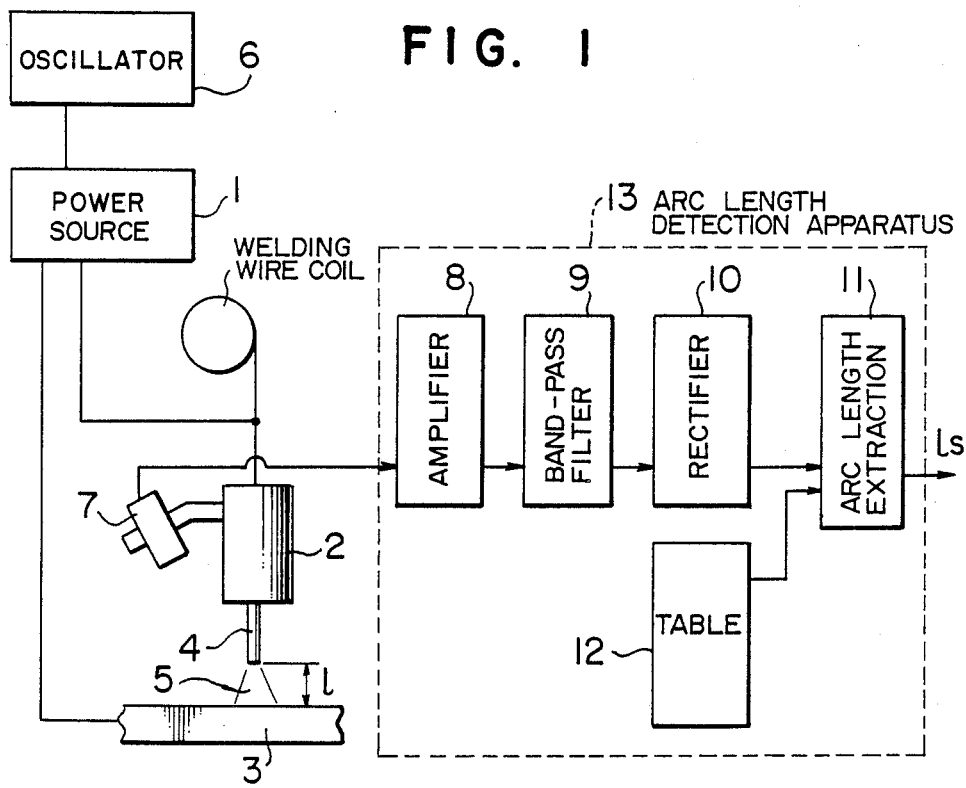
FIG. 1 is a block diagram of an arc length detection apparatus in accordance with the present invention.

Referring to FIG. 1 which is a block diagram of an arc length detection apparatus embodying the present invention, a torch 2 carries a welding wire 4 which opposes base metal members 3. A welding power source 1 is electrically connected to the wire 4 and the base metal members 3 so that an arc is generated at the end of the wire 4. A symbol l represents the arc length. An oscillator 6 is connected to the welding power source 1. A microphone 7 is attached to the torch 2. An amplifier 8, a band-pass filter 9, a rectifier 10 and an arc length extraction 11 are connected in the mentioned order to the output terminal of the microphone 7. An arc length/sound pressure level table 12 also is connected to the input side of the arc length extraction 11. The amplifier 8, band-pass filter 9, rectifier 10, arc length extraction 11, arc length/sound level table 12, oscillator 6 and the microphone 7 in combination provide an arc length detection apparatus which is denoted by 13.

The welding power source 1 supplies electrical power to the torch 2 and the base metal members 3 so that an arc 5 of a length l is generated between the wire 4 and the base metal members 3. The illustrated manner of connection of the oscillator 6 is not exclusive. Namely, the oscillator 6 may be connected in any suitable manner provided that it can oscillate and superpose an A.C. signal of a predetermined frequency, e.g., 1 KHz, on the arc 5.

The electrical signal corresponding to the sound picked up by the microphone 7 is amplified by the amplifier 8 the output of which is delivered to the band-pass filter 9. The band-pass filter 9 is designed to pass only the electrical signal of the frequency set by the oscillator 6. The signal which has passed through the band-pass filter is delivered to the arc length extraction 11 through the rectifier 10. The arc length extraction 11 produces an electrical signal $l_s$ corresponding to the arc length l, in accordance with the received electrical signal representing the sound pressure level, by making reference to the arc length/sound pressure level table 12.

A description will be given of the principle of operation of the arc length detection apparatus of FIG. 1, with specific reference to FIGS. 2 to 7.

Figure 2:
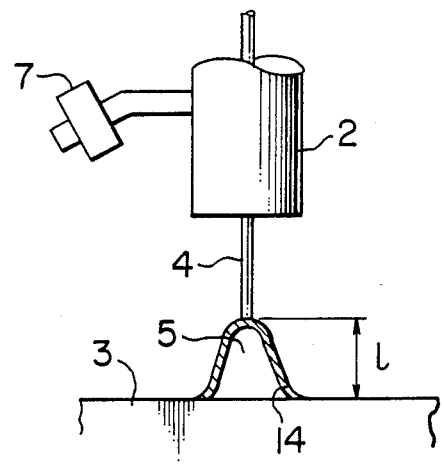
FIG. 2 is an enlarged view of a portion of the apparatus of FIG. 1 near a welding torch.
Figure 3:
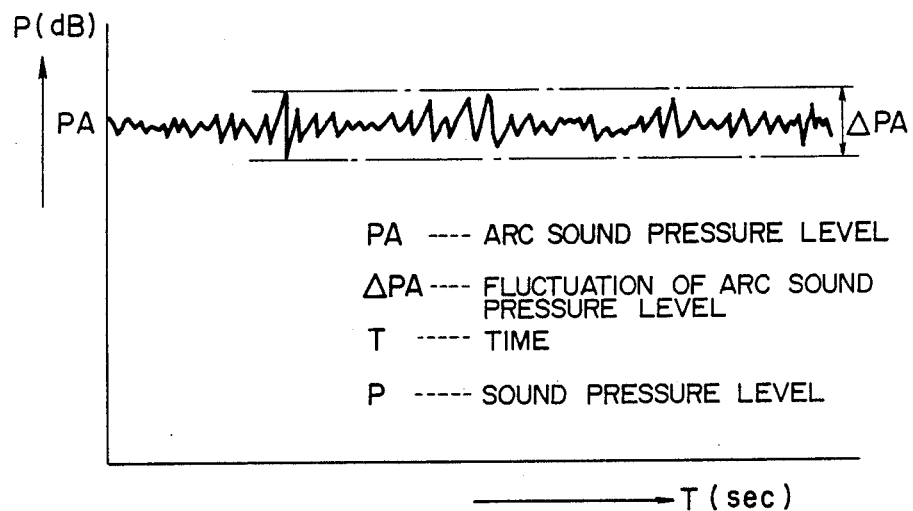
FIG. 3 is a chart showing time-sound pressure level characteristics of the apparatus shown in FIG. 2.

FIG. 2 illustrates the state of generation of an arc as obtained when no superposition signal is applied to the arc. Usually, the arc has a fluctuating portion as denoted by hatching 14. The arc sound measured by the microphone 7 varies in relation to time in a manner shown in FIG. 3 in which T represents the time while P represents the sound pressure level. It will be seen that the arc sound pressure level fluctuates within a range represented by $\Delta PA$. This fluctuation appears as noises which hampers precise detection of the arc sound pressure level which represents the torch height.

Figure 4A:
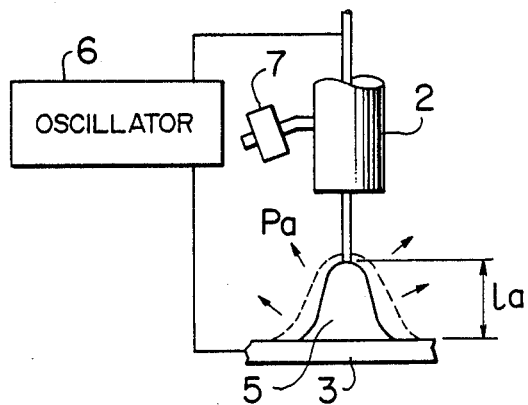
FIGS. 4A and 4B are enlarged views of the portion of the apparatus of FIG. 1 near the welding torch.
Figure 4B:
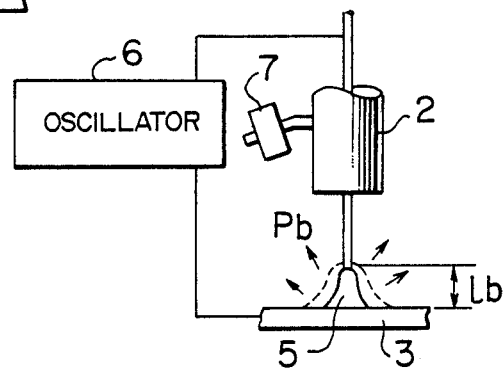

FIGS. 4A and 4B schematically show the states of arc generated when an A.C. signal such as a sine wave signal of a predetermined frequency is applied to the arc by means of the oscillator 6. More specifically, FIG. 4A shows the state in which the arc length is greater than a set length, while FIG. 4B shows the state in which the arc length is shorter than the set arc length. As will be seen from broken-line curves in these Figures, the arc 5 oscillates in synchronization with the superposition signal added thereto. Pa and Pb represent the arc sound pressure levels, while la and lb represent the arc lengths.

Figure 5:
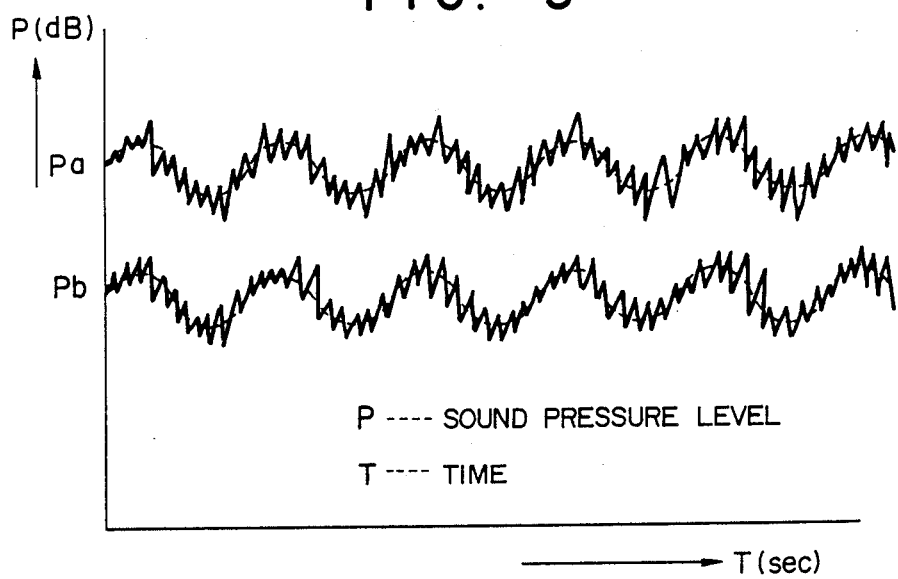
FIG. 5 is a chart showing time-sound pressure level characteristics of the apparatus shown in FIG. 2.

FIG. 5 shows the manner in which the sound pressure level varies in accordance with the oscillation of the arc. A curve Pa shows the sound pressure level as obtained when the arc length l is la, while a curve Pb shows the sound pressure level as obtained when the length l is lb.

As will be seen from FIG. 5, there is a tendency that the sound pressure level P becomes higher as the arc length becomes greater. This is attributable to a fact that the spread of the arc becomes greater as a result of elongation of the arc with the result that the level of the sound pressure propagated through the air is increased.

Figure 6:
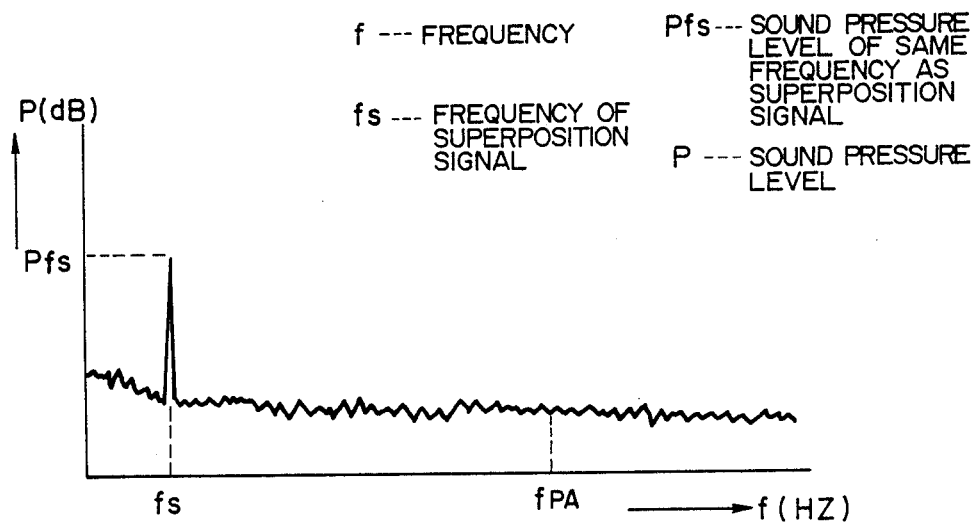
FIG. 6 is a chart showing the time-sound pressure level characteristic of the apparatus shown in FIG. 1.

FIG. 6 shows the frequency distribution as obtained when the superposition signal is added to the arc. In this Figure, a symbol $f_s$ represents the frequency of the superposition signal, while Pfs represents the sound pressure level of the same frequency as the superposition signal. From this Figure, it will be understood that peaks of sound pressure appear at the same frequency as the superposition signal, so that the noise components (fPa) corresponding to the fluctuation $\Delta P_a$ shown in FIG. 3 can be neglected.

FIG. 7 shows the relationship between the arc length l and the sound pressure level Pfs which corresponds to the frequency fs of the superposition signal. A symbol $l_0$ represents the initial set value of the arc length, while $P_0$ represents the sound pressure level corresponding to the frequency of the superposition signal. The relationship as shown in FIG. 7 is stored in the form of a table, i.e., the arc length/sound pressure table 12 of FIG. 1, so that the arc length can be determined by making reference to the table in accordance with the detected sound pressure level.

FIG. 8 is a block diagram of an embodiment of a torch height control apparatus which makes use of the arc length detection apparatus of FIG. 1. As stated before, the arc length detection apparatus 13 delivers an electrical signal $l_s$ corresponding to the detected arc length. This electrical signal $l_s$ is delivered to a comparator 14 which also receives an electrical signal $l_{0s}$ derived from a reference arc length setting device 15. The comparator 14 compares these signals with each other and produces an offset signal "e" corresponding to the difference between the signals $l_s$ and $l_{0s}$. A motor control circuit 16 controls a motor 17 such as to drive the torch up or down thereby to negate the offset signal "e", whereby the torch height Ex is controlled in such a manner that the actual arc length l coincides with the set arc length $l_0$. In this case, the torch height Ex means, for example, the distance between the end surface of a tip formed on the end extremity of the torch member and the upper surface of the base metal member 3 as measured in the vertical direction, i.e., in the direction of force of gravity, as illustrated in FIG. 8.

Although not shown, a control apparatus of the present invention may be constructed such as to control the welding current, arc voltage or other factors besides the torch height, in such a manner as to nullify the arc length offset signal "e". Namely, fluctuation in the arc length may be caused also by factors other than fluctuation in the torch height, e.g., a variation in the wire feed rate, welding current or the arc voltage. According to the present invention, therefore, such factors can be controlled by detecting the arc length in the manner described and operating a suitable controller in place of the motor control circuit 16 of FIG. 8 in accordance with the result of detection of the arc length.

Although a constant-voltage type power source is used as the welding power source of the present invention, the described control can equally be executed with a constant-current type welding power source. It is also to be noted that the A.C. signal to be superposed on the arc can have various waveforms such as a sine waveform, a rectangular waveform or a triangular waveform, provided that it can produce distinctive peaks of the arc sound pressure level as shown in FIG. 6.

Although the described embodiment employs a separate oscillator designed to superpose an A.C. signal on the arc, the separate provision of the oscillator is not exclusive. Namely, the external oscillator may be omitted if a power source having an oscillator therein, e.g., a pulse welding power source, is used as the welding power source. The superposition of the A.C. signal need not be executed continuously. In other words, the period of time through which the A.C. signal is added to the arc may be determined as desired. Thus, the A.C. signal to be superposed to the arc may be a so-called intermittent signal.

According to another embodiment of the present invention which is not shown, a short-circuit arc detection circuit is added to the circuit shown in FIG. 8, in order to eliminate influences of noises generated at the time of short-circuiting of the arc and at the time of recovery of the arc. With such an arrangement, it is possible to detect the arc sound only when the arc is normally maintained. When a welding robot is used for the purpose of driving the welding torch, the motor control circuit 16 of the arrangement shown in FIG. 8 may be substituted by a robot control circuit.

Figure 9:
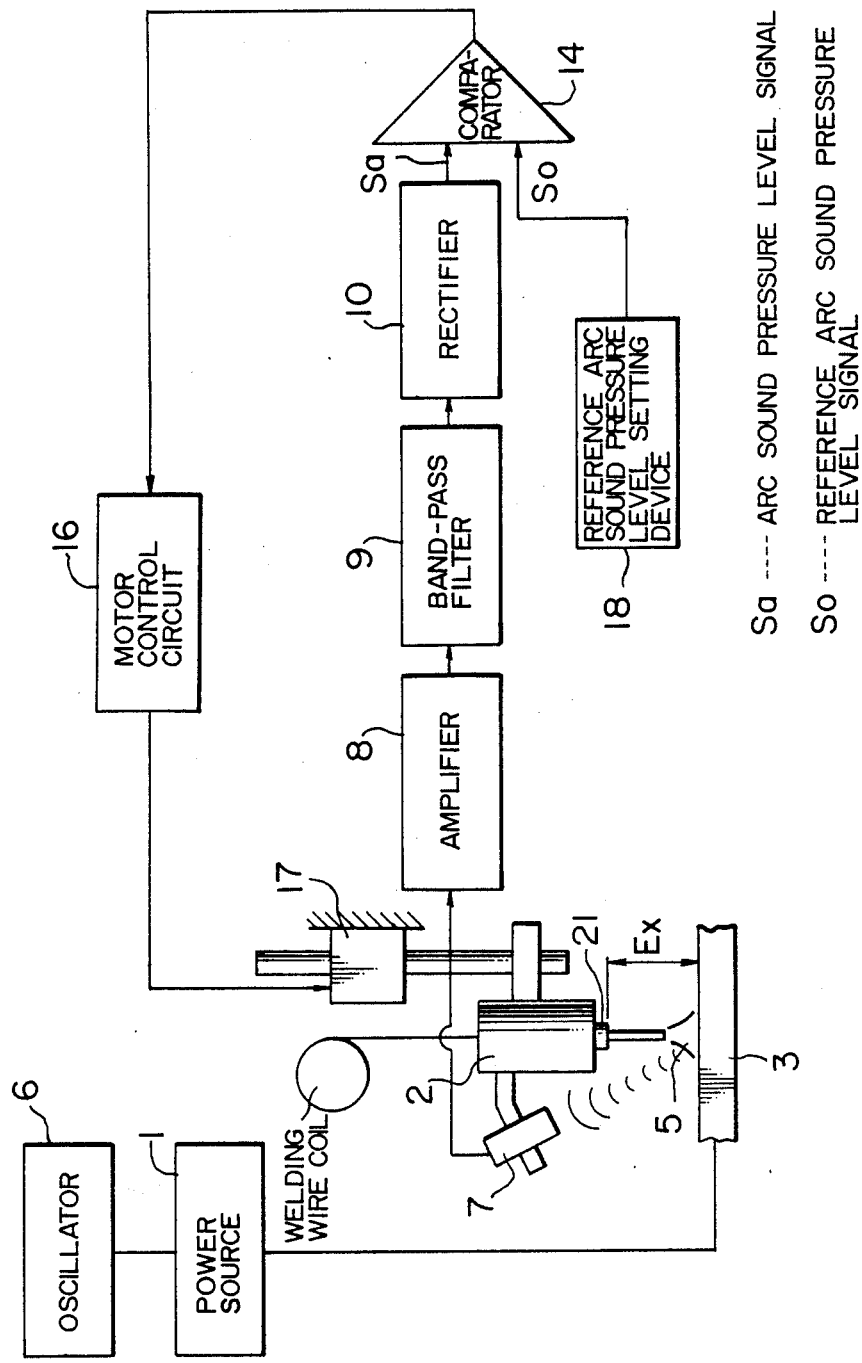

Referring now to FIG. 9 showing a different embodiment, a reference arc sound pressure level setting device 18 supplies a comparator 14 with a reference arc sound pressure level signal $S_0$ which corresponds to the set value of the distance between the torch and the base metal member. The comparator 14 also receives an arc sound pressure level signal $S_a$ and compares the signals $S_0$ and $S_a$ with each other. Then, a control which is substantially the same as that explained in connection with FIG. 8 is executed in accordance with the result of the comparison.

FIG. 10 is a characteristic chart showing the relationship between the sound pressure level (reference value) and the distance of the torch from the base metal member. In this embodiment, therefore, the welding condition is automatically conducted directly in accordance with the sound pressure level, without requiring the detection of the arc length.

FIG. 11 is a block diagram of a torch position detecting/control apparatus embodying the present invention which is designed to detect and control the position of the torch two dimensionally, i.e., both in the horizontal and vertical directions.

A pair of base metal members 31, 32 are placed together such that they form an L-shaped joint to be welded. A wire 4 of a welding torch 2 is placed to oppose the joint to be welded so that the torch is inclined with respect to each of the base metal members as illustrated. A welding power source 1 is electrically connected to the wire 4 and the base metal members so that an arc 5 is generated on the end of the wire 4. A symbol l represents the length of the arc generated in this embodiment. An oscillator 6 is connected to the welding power source 1. A pair of microphones 71 and 72 attached to the torch 2 have outputs to which are connected amplifiers 81, 82, band-pass filters 91, 92 and rectifiers 101, 102, respectively.

A table 121 storing the relationship between the lateral or horizontal torch position and the sound pressure level (referred to as "horizontal torch position-sound pressure level table") is connected to the output end of the rectifier 101. A symbol Sa' represents an arc sound pressure level signal. Similarly, a table 122 storing the relationship between the arc length and the sound pressure level (referred to as "arc length-sound pressure level table") is connected to the output end of the rectifier 102. The amplifier 82, band-pass filter 92, rectifier 102 and the arc length-sound pressure level table 122 in combination provide an arc length detection apparatus denoted by 132. This arrangement lacks a component which corresponds to the arc length extraction 11 used in the arrangement shown in FIG. 1, because the function of the arc length extraction is incorporated in the arc length-sound pressure level table 122. Similarly, the amplifier 81, band-pass filter 91, rectifier 101, and the horizontal torch position-sound pressure level table 121 in cooperation constitute a horizontal torch position detection apparatus which is generally denoted by 131.

In operation, the welding power source 1 delivers electrical power to the torch 2 and the base metal members 31, 32, so that an arc 5 of the length l is generated between the wire 4 and the base metal members 31, 32. The illustrated manner of connection of the oscillator 6 is only illustrative, and any suitable arrangement is possible provided that the oscillator can superpose an A.C. signal of a predetermined frequency, e.g., 1 KHz, to the arc 5.

The microphone 71 is positioned between the torch 2 and the lateral base metal member 31 so as to detect the horizontal position of the torch 2 in terms of the sound reflected from the lateral base metal member 31 in a manner which will be explained later in connection with FIG. 12. The other microphone 72, which is intended for detecting the arc length, is disposed beneath the torch 2, more specifically behind the other base metal member 31 so as not to be affected by the sound reflected from the lateral base metal member 31. Anyway, it is essential that the microphones have high degress of directivity. The microphones need not be installed in parallel with the torch 42. Namely, the microphones may be arranged at suitable angles to the axis of the torch 42 provided that the relationship between the outputs from the microphones and the parameters used in the invention are clearly grasped.

The electrical signals output from the microphones 71 and 72, corresponding to the levels of the sound pressures received by these microphones, are respectively amplified by the amplifiers 81 and 82 and then delivered to the band-pass filters 91 and 92 which are designed to pass only the signal components of the frequency set by the oscillator 6. The signal components which have passed through the band-pass filters 91 and 92 are delivered to the respective tables 121 and 122 through the rectifiers 101 and 102. Upon receipt of these signals, the tables 121 and 122 produce, respectively, electrical signals $X_s$ and $l_s$ which correspond to the horizontal torch position X and the arc length 1, in accordance with the received electrical signals corresponding to the levels of the sound pressures received by the microphones. The torch position signal $X_s$ detected by the torch position detection apparatus 131 is input to the comparator 141 which also receives an electrical signal $X_{0s}$ (See FIG. 11, FIG. 12) derived from a reference horizontal torch position setting device 151. The comparator 141 compares both signals $X_s$ and $X_0$ with each other and produces an offset signal "e'" corresponding to the difference between these signals and delivers the same to a robot control unit 19.

Meanwhile, the arc length detection apparatus 132 delivers the above-mentioned electrical signal $_s$ corresponding to the arc length to the comparator 142. The comparator 142 compares the signal $l_s$ with an electrical signal $l_{0s}$ derived from a reference arc length setting device 152 and delivers to the robot control unit 19 an offset signal "e" corresponding to the difference.

The robot control unit 19 operates to actuate motors and arms such as to negate both the offset signals "e" and "e'" thereby controlling the arc length and the torch position in conformity with the set values.

FIG. 12 comprised of FIGS. 12 (a–d) is an illustration of the relationship between the arc sound pressure level P and the horizontal torch position as obtained when the welding torch 2 is aimed at points deviated from the welding line represented by "0". The deviations are represented by $\Delta X_1$ and $\Delta X_2$.

The following description will be focused mainly on the processing of the signal from the microphone 71, because the signals from the microphone 72 is processed substantially in the same manner as that described before for the purpose of detection of the arc length.

Figure 12A:
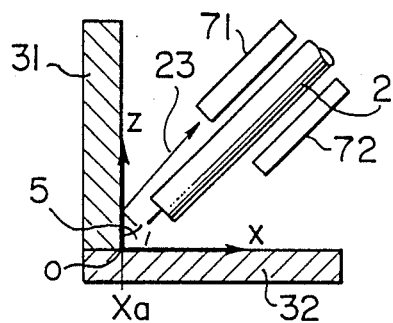
FIG. 12 comprised of FIGS. 12(a-d) is an illustration of the relationship between the welding torch position and arc sound characteristic, explanatory of the copying operation performed by the apparatus of FIG. 11.
Figure 12B:
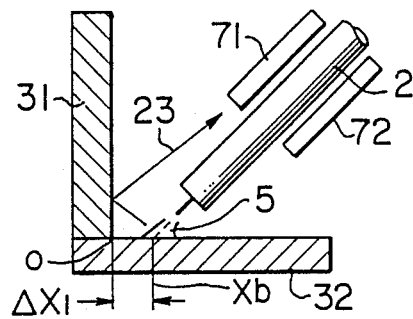
Figure 12C:
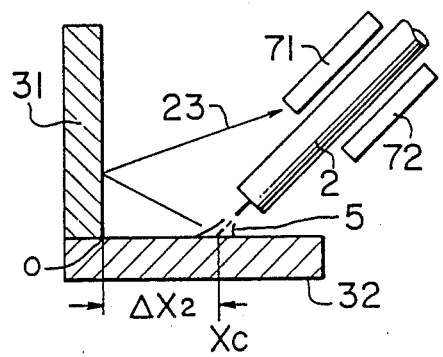
Figure 12D:
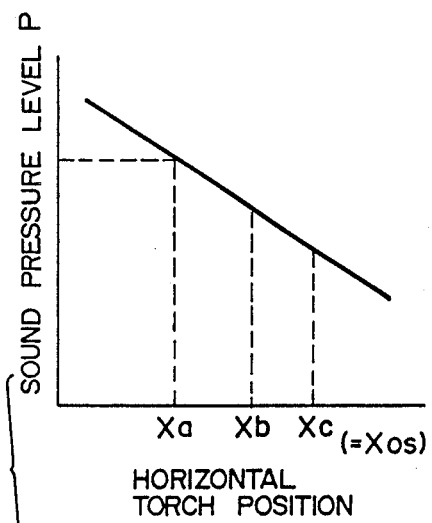

FIG. 12(a) illustrates the case where the welding torch is correctly aimed at the welding line. The microphones 71 receives the arc sound which is the sum of the sound component directly reaching from the arc 5 and the reflected sound components 23 reflected by the lower and lateral base metal members 32 and 31.

The sound component reflected from the lateral base metal member 31 reaches the microphone with a certain degree of delay after the receipt of the sound directly transmitted from the arc, due to the length of the sound transmission path. Section (c) of FIG. 12 shows a state in which the welding torch is spaced apart from the lateral base metal member 31. In Section (b), the torch has been brought to a position closer to the lateral base metal member 31 than in Section (c) and, in Section (a), the torch is closer to the lateral base metal member 31 than in Section (b). As the torch approaches the lateral metal base member 31, the length of path of propagation of the reflected sound is shortened so that the amplitude of the arc sound pressure level is increased correspondingly, with the result that the arc sound pressure level detected by the microphone is increased. This relationship between the sound pressure level and the torch position is illustrated in FIG. 12 (d).

In the described embodiment, the microphone 71 attached to a portion of the torch adjacent to the lateral base metal member 31 receives the sound pressure as the sum of the sound pressure component directly transmitted from the arc and the sound pressure reflected from the lateral base metal member. The level of the sound pressure received by the microphone 71 therefore varies in accordance with the change in the horizontal position of the torch with respect to the lateral base metal member. The horizontal position of the torch with respect to the aimed position is therefore controlled by making an efficient use of this phenomenon. The arc length will not be changed substantially if the torch is moved only in the lateral or horizontal direction. In such a case, the horizontal torch position alone is controlled in accordance with the sound reflected by the lateral base metal member.

The preferred embodiments described hereinbefore have a common feature that an A.C. signal of a predetermined frequency is superposed to the welding arc and only the component of the arc sound pressure level corresponding to this frequency is picked up. In a specific form of the invention, means are provided for enabling discrimination between a state in which short-circuiting of arc is taking place and a state in which the arc is normally maintained, so that the extraction of the arc sound pressure level is executed only when the arc is normally maintained. The A.C. signal superposed on the arc has an oscillation amplitude which is greater than the oscillation of ordinary arc column, and only the arc sound pressure level component of the frequency corresponding to the A.C. signal is extracted, so that the arc sound pressure level corresponding to the arc length or torch position can be precisely detected without being influenced by noise components, thus ensuring a high degree of precision in the automatic welding control.

What is claimed is:

1. An apparatus comprising:
    oscillation means for superposing a predetermined signal on a welding arc;
    arc sound detecting means for detecting the welding arc sound generated by said arc with said predetermined signal superposed thereon;
    sound pressure level extraction means for extracting and outputting, from the output of said arc sound detecting means, an arc sound pressure level signal having a frequency corresponding to the frequency of said predetermined signal; and
    arc length determination means for determining the value of the length of said welding arc in response to the arc sound pressure level signal in accordance with a previously stored relationship between the arc length and the arc sound pressure level, and providing an output signal indicative thereof.

2. An apparatus according to claim 1, further comprising:
    comparator means for conducting a comparison between the signal output from said arc length determination means and a set arc length signal derived from a reference arc length setting device; and
    driving means for driving a welding torch up and down in such a manner as to negate an offset signal from said comparator means, thereby controlling said welding torch to be at a constant height.

3. An apparatus according to claim 1, further comprising:
    comparator means for comparing the signal output from said arc length determination means with a set signal derived from said reference arc length setting device; and welding condition control means for controlling a welding condition in such a manner as to negate an offset signal obtained as a result of the comparison performed by said comparator means.

4. A method comprising:
superposing a predetermined signal on a welding arc;
determining an arc sound pressure level of a frequency corresponding to the frequency of said predetermined signal from the sound received from said welding arc; and
determining the length of said welding arc in response to the determined arc sound pressure level in accordance with a previously stored relationship between the arc sound pressure level and arc length.

5. A method according to claim 4, further comprising the steps of:
comparing the determined arc length signal with a set signal derived from a reference arc length setting device; and
driving a welding torch up and down in such a manner as to negate an output offset signal obtained as a result of the comparison.

6. A method according to claim 4, further comprising the steps of:
comparing the determined arc length signal with a set signal derived from a reference arc length setting device; and
controlling a welding condition in such a manner as to negate an offset signal obtained as a result of the comparison.

7. An apparatus comprising:
oscillation means for superposing a predetermined signal on a welding arc;
arc sound detecting means for detecting the welding arc sound generated by said arc with said predetermined signal superposed thereon;
sound pressure level extraction means for extracting and outputting, from the output of said arc sound detecting means, an arc sound pressure level signal having a frequency corresponding to the frequency of said predetermined signal; and
torch height control means for controlling the torch height in terms of the distance between the torch an da base metal member in response to the sound pressure level signal in accordance with a previously stored relationship between the arc sound pressure level and the torch height.

8. A method comprising the steps of:
superposing a predetermined signal on a welding arc;
determining an arc sound pressure level of a frequency corresponding to the frequency of said predetermined signal from the sound received from said welding arc; and
controlling a torch height in terms of the distance between the torch and the base metal member in response to the determined arc sound pressure level in accordance with a previously stored relationship between the arc sound pressure level and the torch height.

9. An apparatus comprising:
oscillation means for superposing a predetermined signal on a welding arc;
arc sound detecting means for detecting the welding arc sound generated by said arc with said predetermined signal superposed thereon;
sound pressure level extraction means for extracting and outputting, from the output of said arc sound detecting means, an arc sound pressure level signal having a frequency corresponding to the frequency of said predetermined signal; and
torch position determination means for determining the position of said welding torch in response to the arc sound level pressure signal in accordance with a previously stored relationship between the torch position and the arc sound pressure level, and providing an output signal indicative thereof.

10. An apparatus according to claim 9, further comprising:
comparator means for conducting a comparison between the signal output from said torch position determination means and a set torch position signal derived from a reference torch position setting device; and
driving means for driving a welding torch in such a manner as to negate an offset signal from said comparator means, thereby controlling said welding torch to be at a constant position.

11. An apparatus according to claim 9, further comprising:
comparator means for comparing the signal output from said torch position determination means with a set signal derived from a reference torch position setting device; and
welding condition control means for controlling a welding condition in such a manner as to negate an offset signal obtained as a result of comparison performed by said comparator means.

12. A method comprising the steps of:
superposing a predetermined signal on a welding arc;
determining an arc sound pressure level of a frequency corresponding to the frequency of said predetermined signal from the sound received from said welding arc; and
determining a torch position in response to the determined arc sound pressure level in accordance with a previously stored relationship between the arc sound pressure level and torch position, and providing an output signal indicative thereof.

13. A method according to claim 12, further comprising:
comparing the signal corresponding to the torch position torch position setting device; and
driving a welding torch in such a manner as to negate the output offset signal obtained as a result of the comparison.

14. A method according to claim 12, further comprising:
comparing the signal corresponding to the torch position with a set signal derived from a reference torch position setting device; and
controlling a welding condition in such a manner as to negate an offset signal obtained as a result of the comparison.

15. An apparatus comprising:
oscillation means for superposing a predetermined signal on a welding arc;
arc sound detecting means for detecting the welding arc sound generated by said arc with said predetermined signal superposed thereon;
sound pressure level extraction means for extracting and outputting, from the output of said arc sound detecting means, an arc sound pressure level signal having a frequency corresponding to the frequency of said predetermined signal; and torch position control means for controlling the torch position in response to the sound pressure level signal in accordance with a previously stored relationship between the arc sound pressure level and the torch position.

16. A method comprising the steps of:

superposing a predetermined signal on a welding arc;

determining an arc sound pressure level of a frequency corresponding to the frequency of said predetermined signal from the sound received from said welding arc; and controlling a torch position in response to the determined arc sound pressure level in accordance with a previously stored relationship between the arc sound pressure level and the torch position.

17. An apparatus comprising:

oscillation means for superposing a predetermined signal on a welding arc;

arc sound detecting means for detecting the welding arc sound generated by said arc with said predetermined signal superposed thereon;

sound pressure level extraction means for extracting and outputting, from the output of said arc sound detecting means, an arc sound pressure level signal having a frequency corresponding to the frequency of said predetermined signal;

arc length determination means for determining the value of the length of said welding arc in response to the arc sound pressure level signal in accordance with a previously stored relationship between the arc length and the arc sound pressure level, and providing an output signal indicative thereof; and torch position determination means for determining the position of a welding torch in response to the arc sound pressure level signal in accordance with a previously stored relationship between the torch position and the arc sound pressure level, and providing an output signal indicative thereof.

18. An apparatus according to claim 17, further comprising:

comparator means for conducting a comparison between the signals output from said arc length determination means and said torch position determination means and a set arc length signal and a set torch position signal derived from respective setting devices for setting reference values of the arc length and the torch position; and driving means for driving the welding torch vertically and horizontally with respect to a reference in such a manner as to negate offset signals from said comparator means, thereby controlling said welding torch to be at a constant position.

19. An apparatus according to claim 17, further comprising:

comparator means or comparing the signals output from said arc length determination means and said torch position determination means with set signals derived from respective setting devices for setting reference values of the arc length and the torch position; and welding condition control means for controlling a welding condition in such a manner as to negate a plurality of offset signals obtained as a result of comparisons performed by said comparator means.

20. A method comprising the steps of:

superposing a predetermined signal on a welding arc;

determining an arc sound pressure level of a frequency corresponding to the frequency of said predetermined signal from the sound received from said welding arc;

determining the length of said welding arc in response to the determined arc sound pressure level in accordance with a previously stored relationship between the arc sound pressure level and arc length, and providing an output signal indicative thereof; and determining the position of a welding torch in response to the determined arc sound pressure level in accordance with a previously stored relationship between the torch position and the arc sound pressure level, and providing an output signal indicative thereof.

21. A method according to claim 20, further comprising:

comparing the signals corresponding to the arc length and the torch position with set signals derived from respective setting devices for setting reference values of the arc length and the torch position; and driving the welding torch vertically and horizontally with respect to a reference in such a manner as to negate output offset signals obtains as results of the comparison.

22. A method according to claim 20, further comprising the steps of:

comparing the signals corresponding to the arc length and the torch position with set signal derived from respective setting devices for setting reference values of the ar length and the torch position; and controlling a welding condition in such a manner as to negate offset signals obtained as results of the comparison.

23. An apparatus comprising:

oscillation means for superposing a predetermined signal on a welding arc;

arc sound detecting means for detecting the welding arc sound generated by said arc with said predetermined signal superposed thereon;

sound pressure level extraction means for extracting and outputting, from the output of said arc sound detecting means, an arc sound pressure level signal having a frequency corresponding to the frequency of said predetermined signal; and torch position control means for controlling a torch position in response to the sound pressure level signal in accordance with a previously stored relationship between the arc sound pressure level and the torch position.

24. A method comprising the steps of:

superposing a predetermined signal on a welding arc;

determining an arc sound pressured level of a frequency correspnding to the frequency of said predetermined signal from the sound received from said welding arc; and controlling a torch position in response to the determined arc sound pressure level in accordance with a previously stored relationship between the arc sound pressure level and the torch position.

* * * * *